United States Patent Office 3,075,851
Patented Jan. 29, 1963

3,075,851
STABILIZATION OF CLAY SOILS
AND AGGREGATES
John B. Hemwall, Long Beach, Calif., assignor to The Dow Chemical Company, Midland, Mich., a corporation of Delaware
No Drawing. Filed Oct. 26, 1960, Ser. No. 65,005
6 Claims. (Cl. 106—287)

This invention is concerned with the consolidation and stabilization of argillaceous soil and clay containing aggregates and is particularly directed to a method and composition embodying inorganic phosphates and sulfuric acid to accomplish such stabilization.

Many clay soils cause problems, for example in the construction industry, because of their tendency to become plastic and flowable when wetted. Also it is desirable in many parts of the world to use clay soils or clay containing aggregates as building materials, as for example, in the adobe structures of the Southwestern United States and Mexico. Various materials have been added to clay soils and aggregates in an attempt to improve their water repellancy or to maintain the strength of the material when wetted.

It is an object of the present invention to provide a method and composition for stabilizing argillaceous soils and construction materials. It is a further object to provide stabilized argillaceous materials having improved strength when exposed to water. Yet another object is to provide stabilized argillaceous compositions employing inexpensive and readily available additaments. Other objects will become apparent from the following specification and claims.

In accordance with the present invention it has been discovered that the incorporation in argillaceous soils of an inorganic phosphate and a prescribed excess of sulfuric acid provides a composition which may be compacted to produce a stabilized mass having significantly improved compressive strength as compared to the untreated argillaceous soil. It is among the advantages of the invention that the argillaceous soil so treated retains its strength even when immersed in water.

The term "argillaceous soil" as employed herein refers to soils containing at least 15 percent by weight of clay minerals and is exclusive of organic soils, such as peat, of calcareous soils, that is, soils containing greater than 0.5 percent calcium carbonate, and of predominently sandy soils, that is, soils containing more than 50 percent sand. For the purpose of the present invention the clay, silt and sand content of the soil are determined by standard methods as described, for example, by Bouyoucos in Soil Science, volume 44, pages 245 and 246.

In carrying out the invention the inorganic phosphate and sulfuric acid are thoroughly mixed with the argillaceous soil or clay aggregate in any suitable fashion and the resulting mixture is thereafter compacted. In a preferred method of operation the phosphate in finely ground condition is thoroughly mixed with the argillaceous soil while the soil is sufficiently dry to facilitate mechanical mixing and the acid, preferably diluted with several volumes of water, is then sprayed on to the soil while the latter is stirred or otherwise mixed. Thereafter the treated soil is compacted by conventional means as by tamping, rolling, or the like. Following the mixing and compacting steps it is desirable to maintain the treated soil in a moist but not soaked condition for a period of from about 1 to 6 days to provide for curing of the mixture with concurrent development of the desired strength properties.

In operations where the argillaceous soil or aggregate is excavated and treated, as for the preparation of sun-dried building materials, the mixing of the phosphate and acid can be carried out in conventional mixing equipment such as ribbon mixers, sand mullers, pug mills, or the like. Thereafter the mixture may be compacted, for example, by ramming or pressing in molds. Alternatively, where it is desired to stabilize argillaceous soil in place as in the preparation of dams or subsurfaces for road building, the dry, powdered phosphate compound may be spread over the surface of the soil and thoroughly mixed therewith by operations such as discing, harrowing, and dragging. Thereafter the sulfuric acid may be applied by spraying, followed by a further mixing operation, and the mixture compacted by the use of sheep's-foot rollers and the like. Although it is preferred that the phosphate and acid be added consecutively as set forth above, good results can also be obtained by first mixing the acid with the finely divided phosphate and thereafter incorporating the resulting mixture in the soil. Similarly, a portion of the required acid may be added to ground phosphate rock to give an acidulated rock phosphate. The latter is then incorporated in the argillaceous soil and thereafter the remainder of the required acid admixed therewith.

For the purposes of the invention, ground rock phosphate or acidulated rock phosphate is preferred for reasons of economy and availability; however, other inorganic phosphates such as apatite, pebble phosphate and phosphatic wastes from the fertilizer industry may be employed. Similarly, refined phosphate sources such as tricalcium phosphate, calcium acid phosphates, mono-, di-, and trisodium phosphates and the like may be used. In general, the phosphates should be finely ground so that at least 90 percent thereof will pass through a U.S. Standard sieve No. 50 and preferably through No. 100, although somewhat coarser materials can sometimes be employed, particularly with the more soluble phosphates, such as the sodium phosphates and the calcium acid phosphates.

The amounts of inorganic phosphate and sulfuric acid to be employed in accordance with the invention will vary depending upon such factors as the nature and composition of the argillaceous soil or clay aggregate and the degree of strengthening required in a particular application. In general the inorganic phosphate is employed in the form of rock phosphate or acidulated rock phosphate in an amount to provide from about 0.5 to about 5 percent by weight of elemental phosphorus, contained in such phosphate, based on the weight of soil or aggregate treated. The proportion of sulfuric acid is critical for obtaining the desired strengthening and stabilization. Thus it is essential that the total added acid amount to at least 1.5 moles of acid per mole of phosphate. Further it is required that the amount of acid be a predetermined amount such that the treated soil after compaction and curing for six days at a relative humidity of 90 to 100 percent and at a temperature of 20 to 30° C. will have a pH of at least 3.2 when measured in a non-plastic slurry of such treated soil. In a particular instance the acid requirements within the above limitations can be determined by a series of tests with varying amounts of acid on representative portions of the soil to be treated, for example, in accordance with the procedure outlined in Example 1 below. In calculating the amount of acid to be added account should be taken of the acid represented in acidulated rock phosphate if the latter is employed as a phosphate source.

The following examples illustrate the invention but are not to be construed as limiting the same.

*Example 1*

An argillaceous soil was found to contain 18 percent clay, 56 percent silt and 26 percent sand, by weight, as determined by the method described by Bouyoucos, Soil Science, volume 44, pages 245 and 246, using the U.S. Department of Agriculture size standards. This soil contained 1.3 percent by weight of organic matter and had a pH of 7.0. 200-gram portions of said soil were weighed out from a homogeneously mixed, air-dried mass thereof. Each such portion was then mixed with 10.8 grams of finely ground rock phosphate (analyzing 12.5 percent by weight P and representing about 0.043 mole of phosphate) and thereafter sprayed with 23 milliliters of water containing a predetermined amount of sulfuric acid. The rock phosphate was mine-run Idaho phosphate rock, which had been pulverized and screened through a 100 mesh-to-the-inch sieve.

The treated soil portions were each divided into two subsamples of approximately 90 grams and one subsample of approximately 15 grams and each subsample placed in a tubular mold three centimeters in diameter. The subsamples were then compressed from both ends in the mold at a pressure of 737 pounds per square inch (p.s.i.).

The resulting treated soil cylinders were ejected from the molds and cured at room temperature in a chamber maintained at 90 to 100 percent relative humidity. After curing thus for six days, the two larger subsamples from each treatment were immersed in distilled water for 24 hours and then tested while wet for their unconfined compressive strength (UCS). The latter tests were carried out on the unconfined compression test apparatus, Model U-160, manufactured by Soil-Test, Inc. Meanwhile, at the end of the six-day curing period, the smaller subsample from each treatment was crushed, made into a non-plastic slurry with distilled water, and the pH of the slurry determined. The amounts and molar proportions of sulfuric acid employed and results obtained are summarized in the following table.

| Grams $H_2SO_4$ Employed | Moles of $H_2SO_4$ per Mole of Phosphate | UCS, p.s.i. | pH after 6 Days' Cure |
| --- | --- | --- | --- |
| 6.38 | 1.50 | 133 | 3.45 |
| 6.88 | 1.62 | 160 | 3.31 |
| 7.13 | 1.68 | 175 | 3.25 |
| 7.38 | 1.73 | 159 | 3.20 |

A portion of the original soil when compacted and cured in the same fashion had no compressive strength when immersed in water.

*Example 2*

Following the general procedure of Example 1, 10.8 gram portions of ground phosphate rock (12.5 percent P) were intimately mixed with 200 gram portions of an argillaceous soil containing 32.2 percent by weight organic matter and having a pH of 5.9 before treatment. This soil was classified by mechanical analysis as containing 23 percent clay, 38 percent silt and 39 percent sand. Each mixture of phosphate and soil was sprayed with 44 milliliters of water solution, containing either 6.38 or 8.38 grams of $H_2SO_4$, with stirring. The preparation of compacted cylinders of the treated soil and the curing and testing thereof was carried out as in Example 1. The results are summarized in the following table.

| Grams of $H_2SO_4$ per 200 Grams of Soil | Moles of $H_2SO_4$ per Mole of Phosphate | UCS, p.s.i. | pH after 6 Days' Cure |
| --- | --- | --- | --- |
| 6.38 | 1.50 | 22 | 4.1 |
| 8.38 | 1.97 | 36 | 3.5 |

When the untreated soil was compacted and cured in the same manner it was found to have zero compressive strength when immersed in water.

*Example 3*

A 200-gram portion was taken from a heavy clay soil which had been air-dried and pulverized. This soil had a mechanical analysis of 37 percent clay, 38 percent silt and 25 percent sand, contained 1.8 percent organic matter and had a pH of 6.6. To said portion of soil was added 38.6 grams of finely ground, acidulated rock phosphate (containing 8.3 percent by weight of phosphorus, chiefly as $Ca(H_2PO_4)_2$ and corresponding to commercial "superphosphate" fertilizer) with thorough mixing to provide 1.6 percent by weight of phosphorus based on dry soil (0.052 mole of phosphate per 100 grams dry soil). The resulting mixture was sprayed with 20 milliliters of aqueous 12-normal sulfuric acid solution. The total acid represented in the form of pre-acidulation of the rock phosphate plus added acid amounted to 1.59 mole of sulfuric acid per mole of phosphate. The treated soil was compacted, cured and tested for unconfined compressive strength as in Example 1 and found to have a UCS of 352 pounds per square inch.

It will be apparent that the invention as described may be applied to clay aggregates such as prepared mixtures of clay and sand or of clay and other mineral fillers in a manner similar to the above illustrations on natural soils.

I claim:
1. A method for stabilizing argillaceous soil which comprises intimately mixing in such soil a finely divded inorganic phosphate, adding a predetermined amount of sulfuric acid to provide at least 1.5 moles of total acid per mole of added phosphate and such that the treated soil after compaction and curing for six days at a relative humidity of 90 to 100 percent and at a temperature of 20° to 30° C. has a pH of at least 3.2, compacting the treated soil and thereafter curing under high humidity conditions to produce a compacted product having increased compressive strength.

2. A method according to claim 1 wherein the inorganic phosphate is employed in an amount to provide from about 0.5 to about 5 percent by weight of phosphorus, based on the weight of soil.

3. A method according to claim 2 wherein the inorganic phosphate is rock phosphate.

4. A method according to claim 2 wherein the inorganic phosphate is acidulated rock phosphate.

5. A compacted intimate mixture consisting essentially of argillaceous soil, a finely divided inorganic phosphate and aqueous sulfuric acid, the phosphate constituting an amount to provide from about 0.5 to about 5 percent by weight of phosphorus, based on the weight of soil and the sulfuric acid constituting a predetermined amount such as to provide at least 1.5 moles of total acid per mole of phospate and such that the composition after compaction and curing for six days at a relative humidity of 90 to 100 percent and at a temperature of 20° to 30° C. has a pH of at least 3.2.

6. A composition according to claim 5 wherein the phosphate is rock phosphate.

References Cited in the file of this patent
UNITED STATES PATENTS
2,899,329    Lyons _____ Aug. 11, 1959